United States Patent Office 3,690,946
Patented Sept. 12, 1972

3,690,946
MANUFACTURE OF MAGNETIC RECORDING MEDIA

Heinrich Hartmann, 46 Weinheimer Strasse, 6703 Limburgerhof, Germany; Job-Werner Hartmann, 1 Frankenstrasse, 6700 Ludwigshafen, Germany; Hans Wilhelm, 25 Nachtigallenweg, 6951 Heinsheim, Germany; Georg Schnell, 21 Freinsheimer Strasse; and Wolfram Kittler, 12 Ungsteiner Strasse, both of 6700 Ludwigshafen, Germany; Gerhard Werst, 8 Auf dem Sand, 6730 Neustadt, Germany; and Reinhold Baur, 4a Rene-Bohn-Strasse, 6700 Ludwigshafen, Germany
No Drawing. Filed Feb. 16, 1970, Ser. No. 11,818
Claims priority, application Germany, Feb. 18, 1969, P 19 07 957.3
Int. Cl. H01f *10/02*
U.S. Cl. 117—235 6 Claims

ABSTRACT OF THE DISCLOSURE

Magnetic recording media and process for their manufacture by coating a non-magnetic support with a dispersion of magnetic pigment in a binder based on a reactive mixture of (A) a polyisocyanate and (B) a hydroxyl group-containing copolymer prepared by solution polymerization from (1) hydroxyalkyl acrylate or methacrylate, (2) alkyl acrylate or methacrylate, (3) vinylidene chloride and, if desired, (4) a further monomer, such as acrylonitrile, in certain proportions, and curing the applied coating.

This invention relates to a process for the manufacture of a magnetic recording medium by preparing a mixture based on finely dispersed magnetic particles, an improved binder and a solvent, applying the dispersion of magnetic particles in the binder and solvent to a non-magnetic support in the form of a coating and subsequently drying or curing the applied coating containing the magnetizable particles.

It is known to make magnetic recording media by coating non-magnetic supports, such as films, tapes or discs or plastic or other non-magnetizable materials, with a dispersion of a magnetizable material, which must have certain minimum magnetic values, in a binder and an organic solvent. In particular in the manufacture of magnetic discs to be used for data storage, high demands are made on the generally very thin coating. The finished coating should not only adhere firmly to the non-magnetic support but also be highly resistant to solvent attach, temperature changes, moisture and, in particular abrasion. The layer in which the magnetizable material is present embedded in the binder must be very hard but at the same time not brittle. The binder used for preparing this layer therefore largely determines the mechanical and chemical properties of the recording medium. Modern magnetic tapes are highly stressed and tape wear is a complex process. Magnetic recording media are subjected to thermal and abrasive stresses and may be damaged by erosion of the layer containing the magnetic particles due to abraded particles that stick together and adhere to the recording and reproducing heads and by the retransference of abraded material from the recording head to the recording medium. Hence the nature of the abraded material is important. Various polymers and mixtures thereof have been proposed as binders for the dispersion of particulate magnetic pigment. The use of copolymers of major amounts of vinyl chloride with comonomers, such as vinyl acetate, is known. The use of a mixture of polyisocyanates and hydroxyl group-containing polyethers or polyesters, if desired admixed with vinyl polymers, is also known. However, conventional binders are not satisfactory in very respect. Some are difficult to process, whereas others fail to provide the magnetic values or to exhibit the chemical resistances that are desired after they have been dried and aftertreated.

We have now found that the production of magnetic recording media by preparing a dispersion of particulate magnetic pigment in an organic binder based on a mixture of polyisocyanates (A) and hydroxyl group-containing copolymers, an organic solvent which does not react with isocyanate groups and, if desired, conventional additives, applying a layer of said dispersion to a non-magnetic support and then drying or curing the applied layer while avoiding the said difficulties and considerably improving the anchorage of the magnetic powder in the layer, can be carried out by using, as hydroxyl group-containing copolymers (B) in the binder, copolymers prepared by polymerization in an organic solvent from (1) 7 to 25% by weight of a monester of a dihydric aliphatic alcohol having 2 to 8 carbon atoms with acrylic or methacrylic acid;

(2) 25 to 83% by weight of an ester of acrylic or methacrylic acid with a monohydric aliphatic alcohol having 1 to 8 carbon atoms;

(3) 10 to 50% by weight of vinylidene chloride; and (4) 0 to 25% by weight of one or more further copolymerizable monoolefinically unsaturated monomers, of which not more than 3.5% by weight contains groups capable of reacting with isocyanates.

The copolymers (B) used as binder component according to the present invention should contain from 7 to 25%, particularly from 7 to 17%, by weight, based on the total weight of comonomers, of monoester of acrylic acid and/or methacrylic acid with an aliphatic dihydric alcohol having 2 to 8 carbon atoms. Suitable compounds of this type are, in particular, the monoesters of alkanediols containing two primary hydroxyl groups, such as the monoacrylates and monomethacrylates of 1,2-ethylene glycol, 1,3-propanediol and 1,4-butanediol, as well as the monoacrylates and monomethacrylates of an oligomeric alkanediol, particularly an oligomeric ethylene glycol, such as diethylene glycol or triethylene glycol. Mixtures of said monoesters may of course also be used.

Suitable acrylic or methacrylic acid esters of monohydric aliphatic alcohols having 1 to 8, particularly 2 to 4, carbon atoms which are used in amounts of from 25 to 83%, particularly from 40 to 80%, by weight in the preparation of the copolymers are esters and mixtures thereof which impart a certain degree of elasticity to the copolymers, i.e. which prevent them from becoming brittle without becoming tacky. The corresponding ethyl esters, propyl esters and n-butyl and isobutyl esters are preferred.

The copolymer should contain from about 10 to 50%, preferably from about 10 to 30%, by weight, based on the total weight of monomers, of polymerized units of vinylidene chloride.

The properties of the copolymer and thus of the binder in which it is included may be varied or adapted, to a limited extent, to the special requirements of actual use by employing up to 25%, particularly from about 0.5 to 10%, by weight, based on the total weight of the monomers, of further copolymerizable olefinically unsaturated monomers preferably having 2 to 20 carbon atoms, in the preparation of the copolymer. The copolymerized radicals of such monomers should in general not contain any groups capable of reaction with isocyanate groups under the operating conditions, but they may in special cases contain not more than 3.5% by weight of such reactive groups, based on the total weight of monomers. Suitable further monomers are conventional monomers, such a vinylbenzene hydrocarbons having 8 to 12 carbon atoms for example styrene, vinyltoluene, vinylxylene, acrylonitrile, methacrylonitrile, vinyl esters of aliphatic monocarboxylic acids having 2 to 11 carbon atoms, such as vinyl acetate, vinyl propionate and other esters of olefinically unsaturated carboxylic acids having 3 to 5 carbon atoms.

Examples of monomers containing groups which react with isocyanate groups are olefinically unsaturated carboxylic acids having 3 to 5 carbon atoms, such as acrylic, methacrylic, maleic and crotonic acids. A special effect, such as an increase in the adhesion of the coatings to certain substrates, can be achieved by using such monomers. The amount of such monomers should not exceed 3.5% by weight and preferably be from 0.2 to 1.5% by weight of the total weight of monomers.

The preparation of the copolymers (B) used in the present invention is carried out by conventional solution polymerization processes using conventional polymerization initiators in conventional amounts. Suitable solvents are those in which the monomeric components in the said relative proportions are soluble. Examples of such solvents are aromatic hydrocarbons, such as toluene or xylene, ketones, ethers, esters and similar solvents and mixtures thereof. These solvents or solvent mixtures may in turn contain small amounts of additives in which each of the components is not soluble but in which the total mixture goes into solution.

Suitable polymerization initiators are for example organic peroxides, such as benzoyl peroxide, di-tert-butyl peroxide or lauryl peroxide, in particular azo compounds, such as azobisisobutyronitrile, azobisisobutyroamide or similar aliphatic azo compounds which decompose at temperatures below 100° C. with the formation of free radicals. Of course, redox systems and other free radical-forming substances, such as are commonly used for polymerization initiators, may also be used.

Suitable polyisocyanates (A) for crosslinking the hydroxyl group-containing polymers employed in the invention are in particular conventional aliphatic, preferably cycloaliphatic and aromatic di- and tri-isocyanates. Examples of suitable polyisocyanates are hexamethylene diisocyanate, toluylene diisocyanate, the reaction products of 1 mole of a triol, such as 1,1,1-trimethylol propane, and 3 moles of toluylene diisocyanate; naphthylene-1,5-diisocyanate, 4,4'-diisocyanato-diphenylmethane, 4,4'-diisocyanato-dicyclohexylmethane and similar di- and triisocyanates. Of these polyisocyanates, 4,4'-diisocyanato-dicyclohexylmethane or 4,4'-diisocyanato-dicyclohexylpropane are preferred. The polyisocyanates are used in such an amount that about 0.8 to 1.4 moles, particularly from 1 to 1.1 moles, of isocyanate groups are present per mole of hydroxyl groups in the hydroxyl group-containing copolymers (B) used in the mixture. The above types of polyisocyanate may of course be replaced by masked polyisocyanates which dissociate at elevated temperatures, in particular at temperature between 100° and 200° C., to form free polyisocyanates, such as the phenylurethanes derived from the above polyisocyanates.

In carrying out the process of the invention for the manufacture of magnetic recording media the mixtures of polyisocyanates (A) and hydroxyl group-containing copolymers (B) may, if desired, be mixed with other conventional binders, particularly copolymers of monoolefinic monomers; special effects may thus be achieved in some cases. Examples of such other binders are acrylic ester polymers or copolymers, vinyl ester polymers or copolymers, in particular copolymers comprising more than 60%, particularly more than 75%, by weight of vinyl chloride with vinyl esters of aliphatic monocarboxylic acids having 2 to 11 carbon atoms, such as vinyl acetate or vinyl propionate, which may in turn contain minor quantities, such as less than 15%, particularly less than 10%, by weight of hydroxyl group-containing copolymer units such as vinyl alcohol units. In general, however, the amount of said other binder in the total mixture should be less than the amount of the copolymers (B).

Suitable magnetic pigments for use in the process of the invention are the ferromagnetic powders commonly used for magnetic recording media. Particulate acicular or cube-shaped γ-iron (III) oxide preferably having an average particle size of from 0.1 to 2μ, particularly from 0.1 to 1μ, is preferred. Other suitable magnetic pigments are mixtures of oxides of bivalent and trivalent iron and mixtures of iron oxides with oxides of other metals; ferromagnetic chromium oxide and modified forms thereof produced by the addition of other metals or metal oxides; metal powders, such as iron or cobalt in powder form; or particulate metal alloys of heavy metals, in particular of iron, cobalt and/or nickel. It has been found to be advantageous to use from 2.4 to 4.5, preferably 3.5, parts by weight of magnetic pigment per part of binder ($A+B$).

The dispersion should, if possible, contain one or more solvents for the hydroxyl group-containing copolymers and the polyisocyanates used in the invention. Suitable solvents are those which do not react with isocyanates and which boil below 120° C., such as ethyl acetate, tetrahydrofuran, toluene, chloroform, methylene chloride, acetone or methyl ethyl ketone. It is, of course, possible to use mixtures of solvents of the above types as well as other solvents and solvent mixtures commonly used as binders for surface coatings instead of the above examples of the preferred aromatic hydrocarbons, glycol ethers, glycol ether esters and ketones, provided the binders are soluble therein and the solvents used are inert to isocyanates. The solvents are generally employed in amounts of from about 40 to 75% by weight, based on the total weight of the other components of the dispersion.

Suitable non-magnetic supports which may be used in the manufacture of the magnetic recording media are, due to the good adhesive properties of the binders used in the invention, any of those commonly used for this purpose, such as cellulose triacetate, polyvinyl chloride, in particular linear polyesters, such as polyethylene terephthalate, which may be in the form of discs or particularly in the form of film.

The support is coated with the coating compositions used according to the present invention in a conventional manner. For example, solutions of the hydroxyl group-containing copolymers (B) and solutions of the polyisocyanates (A) may be prepared and the particulate magnetic pigments added to one or both of these solutions, if desired in the presence of a dispersing agent, such as stearic acid; the reactive components thus obtained may be mixed together just before application to the support. If it is desired to cure the coating on the support particularly quickly, this may be achieved by raising the temperature. If elevated temperatures are used, the free isocyanates may be replaced by masked isocyanates, in which case the reactive mixture will have to be heated to temperatures above 100° C. In general, the dispersion is applied to the rigid or flexible support in a conventional manner shortly after, for example 5 to 20 minutes after, the reactive components of the binder have been combined. The coating is then dried to remove the solvent, particularly at temperatures of from 80° to 120° C. Higher temperatures may of course be used, but the upper temperature limit is determined by the type of support. After drying, it is particularly advantageous to finish the coating at 20° to 80° C. by passing the coated support between rollers which may be heated if desired, and if possible immediately afterwards, to temper the coated support for about 1 to 3 days at approximately 60° to 80° C. The process of the invention has a number of advantages and, owing to the great hardness and very good adhesion to the substrate of the layers prepared with the binders used according to the invention and to the good pigment binding power of the binder mixtures, is also very suitable for the manufacture of magnetic discs using metal, particularly aluminum, supports. The magnetic recording media produced according to the process of the invention are superior in many respects to magnetic recording media made by conventional processes involving the use of hydroxyl group-containing components and polyisocyanates as binders. The mixtures of binder and ferromagnetic pigment used in the invention are distinguished particularly by excellent adhesion to the supports and high abrasion resistance of the magnetic layer which does not increase wear on the magnetic heads to an undue extent. The excellent life in stop motion of the magnetic layer is surprising, for example on a helical scan video tape recorder using half-inch magnetic tapes the life in stop motion of a magnetic recording medium prepared according to the invention was found to be more than 90 minutes without there being any deterioration in picture quality, which indicated that the magnetic coating had not been detrimentally affected. In comparison, the life of a magnetic recording medium produced in the same manner but with a copolymer containing 89% by weight of vinyl chloride units, 5% by weight of vinyl acetate units and 6% by weight of vinyl alcohol units as the sole hydroxyl group-containing binder, was only 10 minutes.

The invention is further illustrated by the following examples in which parts and percentages are by weight.

EXAMPLE 1

(a) Preparation of hydroxyl group-containing copolymer (B)

Of a mixture of 15 parts of 1,4-butanediol monoacrylate, 25 parts of vinylidene chloride, 59 parts of n-butyl acrylate, 1 part of acrylic acid, 100 parts of toluene and 0.2 part of azodiisobutyronitrile about one-tenth of the total amount is heated to 85° to 90° C. in a polymerization vessel with stirring and in the absence of oxygen. When polymerization has started, the remainder of the mixture is added in the course of 2 hours. The temperature of the polymerization mixture is then kept at 85° C. for a further 12 hours, 0.2 part each of azodiisobutyronitrile being added after 1, 3 and 5 hours. The product is a 49% solution of the copolymer (B) having a hydroxyl number of 66.

(b) Manufacture of magnetic recording media 300 parts of acicular γ-iron (III) oxide produced by the acid process are placed in a ball mill containing 600 parts of 3 mm. steel balls together with 160 parts of tetrahydrofuran, 240 parts of toluene, 45 parts of a copolymer containing 89% of vinyl chloride units, 5% of vinyl acetate units and 6% of vinyl alcohol units and 15 parts of a $C_{14}$ fatty acid propyl ester as dispersing agent. Milling is effected for 26 hours. There are then added 60 parts of a 49% solution of the above copolymer (B) in a mixture of 40% of tetrahydrofuran and 60% of toluene, and 140 parts of this solvent mixture. Dispersion is continued for a further 26 hours, and there are then added 4.44 parts of 4,4′-diisocyanato-diphenylmethane (A) with stirring.

The magnetic dispersion thus obtained is filtered under pressure through a paper filter and applied by means of coating equipment to polyethylene terephthalate film 20μ in thickness. The acicular magnetic particles are oriented longitudinally, and the coating is dried in hot air at 60° to 90° C. The resulting magnetic coating is approximately 6μ thick. The coated film is then passed through the nip, approximately 80 cm. wide, of rollers heated to 75° C. and applying a total pressure of 180 kg., and then cut up into half-inch tapes. The magnetic values are: coercive force 274 oersteds, saturation 1,005 gauss, remanence 598 gauss (measured in the direction of tape travel).

The life in stop motion of such half-inch tapes on a helical scan video tape recorder is more than 90 minutes without there being any deterioration in picture quality, which indicates that the magnetic coating has not been detrimentally affected.

In a comparative experiment in which the copolymer (B) is omitted and the sole binder used is the vinyl chloride/vinyl acetate copolymer mentioned above in this example, the magnetic tape being made in the same manner and the total amount of binder and the amounts of all other components being the same, the life of the magnetic tape in stop motion is only 10 minutes.

EXAMPLE 2

750 parts of γ-iron (III) oxide produced by the alkaline process is placed in a steel ball mill. There are added 1,200 parts of a mixture of 40% tetrahydrofuran and 60% toluene, 52 parts of the dispersing agent mentioned in Example 1 and 170 parts of a 49% solution of the copolymer (B) of Example 1 in the abovementioned solvent mixture.

Dispersion is carried out for 24 hours, and 170 parts of the solution of copolymer (B) and 27 parts of 4,4′-diisocyanatodicyclohexylmethane are then added. Further processing is as described in Example 1 and there are produced quarter-inch tapes having the usual electroacoustic values. These tapes are distinguished by the fact that they can be drawn across white filter paper wound round steel rods 10 mm. in diameter for 10 minutes under a tension of 60 g. without any brown abraded material appearing on the paper. The same applies when the magnetic tape used in this test is drawn across emery paper.

EXAMPLE 3

(a) Preparation of hydroxyl group-containing copolymer (B)

A mixture of 10 parts of 1,4-butanediol monoacrylate, 10 parts of vinylidene chloride, 10 parts of acrylonitrile, 70 parts of n-butyl acrylate, 100 parts of toluene and 0.15 part of azobisisobutyronitrile is prepared and about one tenth thereof is heated in a polymerization vessel with stirring under nitrogen to a temperature of from 85° to 90° C. After polymerization has commenced, the remainder of the mixture is added in the course of 2 hours. When all of the mixture has been added, 0.15 part each of azobisisobutyronitrile is added after 1, 3 and 5 hours, the temperature of the polymerization mixture being kept at 85° C. After a total of 15 hours there is produced a 50% copolymer solution having a hydroxyl number of 39.

(b) Manufacture of magnetic recording media 750 parts of acicular γ-iron (III) oxide produced by the acid process is dispersed for 48 hours in a ball mill containing about 5,000 parts of steel balls together with 1,700 parts of a solvent mixture of 40% of tetrahydrofuran and 60% of toluene, 37.5 parts of the dispersing agent of Example 1, 112.5 parts of a copolymer prepared from 80% of vinyl chloride, 10% of diethyl maleate and 10% of dimethyl maleate and 150 parts of a 50% solution of the copolymer (B) prepared under (a) in the abovementioned solvent mixture. After filtration, processing is as described in Example 1. Crosslinking is effected before application of the coating by adding 12 parts of 4,4′-diisocyanatodiphenylmethane with stirring.

The acicular magnetic particles are oriented at an angle of 60° to the direction of tape travel. After compression between rollers, the film is cup up into 2″ magnetic tapes. The magnetic layer has a density of magnetic pigment of 1.83 and a coercive force of 267 oersteds. These magnetic tapes exhibit virtually no cupping and have a sensitivity of +1 decibel in a helical scan video tape recorder with reference to a reference tape. Recordings can be played back over 200 times without there being any deterioration in picture quality.

EXAMPLE 4

A homogeneous dispersion is prepared by milling a mixture of 100 parts of γ-iron (III) oxide produced by the acid process, 180 parts of mixture of 60% of toluene and 40% of tetrahydrofuran, 25 parts of a copolymer (B) prepared from 59% of n-butyl acrylate, 25% of vinylidene chloride, 15% of 1,4-butanediol monoacrylate and 1% of acrylic acid, and 12 parts of a $C_{14}$ fatty acid propyl ester as dispersing agent for 6 days in a ball mill containing 1,000 parts of 8 mm. steel balls.

The resulting magnetic dispersion is then mixed with 2 parts of 4,4'-diisocyanatodiphenylmethane (A) with stirring, filtered under pressure through a paper filter and applied by means of coating equipment to polyethylene terephthalate film 20μ in thickness. The magnetic particles are oriented longitudinally. The coated film is dried in hot air at 60° to 90° C. The resulting magnetic coating has a thickness of approx. 6μ. The coated film is then passed through the nip, approximately 80 cm. wide, of rollers heated to 75° C. and applying a total pressure of 180 kg., and then cut into ½" and 1" tapes.

Comparative experiment

Magnetic tapes are prepared as described in Example 4, but the copolymer (B) used therein is replaced by the following copolymers produced by solution polymerization (in toluene and tetrahydrofuran):

(V–A) Copolymer derived from 33 parts of isobutyl acrylate, 8.9 parts of β-hydroxypropyl methacrylate and 8.9 parts of acrylonitrile; hydroxyl number 42.

(V–B) Copolymer derived from 17.5 parts of isobutyl acrylate, 6.5 parts of 1,4-butanediol monoacrylate, 5 parts of acrylonitrile and 0.5 part of acrylic acid; hydroxyl number 52.7.

(V–C) Copolymer derived from 70 parts of vinyl chloride, 20 parts of vinyl propionate and 10 parts of 1,4-butanediol monoacrylate; hydroxyl number 38.7.

Tests on recording tapes made as described in Example 4 and the above comparative experiments.

The life in stop motion of the magnetic tapes is tested in helical scan video tape recorders of the following types:

Sony recorder: ½" tape width, ferrite head.
Shibaden recorder: ½" tape width, metal head.
Philips recorder: 1" tape width, ferrite head.

The results of the tests are given in the following table which shows the distinct superiority of the tapes made according to Example 4, i.e. according to the invention.

TABLE

| | Life in stop motion of tapes made according to— | | | |
|---|---|---|---|---|
| Recorder | Example 4, min. | V-A, min. | V-B, min. | V-C, min. |
| Sony | 150 | 25 | 10 | 20 |
| Shibaden | 60 | 12 | 1 | 2 |
| Philips | 20 | 8 | 1 | 5 |

We claim:

1. In a process for the manufacture of magnetic recording media by preparing a dispersion of particulate magnetic pigment in a binder based on a mixture of a polyisocyanate (A) and a hydroxyl group-containing copolymer (B), an organic solvent which does not react with isocyanate groups applying a layer of said dispersion to a non-magnetic support and then drying or curing the applied layer, the improvement which comprises using, as the hydroxyl group-containing copolymer (B) in the binder, a copolymer prepared by polymerization in an organic solvent from (1) 7 to 25% by weight of a monoester of a dihydric aliphatic alcohol having 2 to 8 carbon atoms with acrylic or methacrylic acid;
(2) 25 to 83% by weight of an ester of acrylic or methacrylic acid with a monohydric aliphatic alcohol having 1 to 8 carbon atoms;
(3) 10 to 50% by weight of vinylidene chloride; and
(4) 0 to 25% by weight of further copolymerizable monoolefinically unsaturated monomers, of which not more than 3.5% by weight contains groups capable of reacting with isocyanates.

2. A process as claimed in claim 1 wherein the copolymers (B) contain, as said further copolymerizable monoolefinically unsaturated monomers from 0.5 to 10% by weight of polymerized units of acrylonitrile or methacrylonitrile.

3. A process as claimed in claim 1 wherein the copolymers (B) contain, as said further copolymerizable monoolefinically unsaturated monomers, 0.2 to 1.5% by weight of polymerized units of an olefinically unsaturated carboxylic acid having 3 to 5 carbon atoms.

4. A process as claimed in claim 1 wherein the copolymers (B) contain from 40 to 80% by weight of polymerized units of an acrylic acid ester or methacrylic acid ester of a monohydric alcohol having 2 to 4 carbon atoms.

5. A process as claimed in claim 1 wherein the binder is modified by the addition of another copolymer of olefinically unsaturated monomers in an amount less than the amount of copolymer (B) in the binder.

6. Magnetic recording media comprising: (1) a nonmagnetic support and (2) a coating on said support of a particulate magnetic pigment dispersed in a binder, said binder comprising a copolymerized mixture of (a) a polyisocyanate and (b) a hydroxyl group-containing copolymer of a polymerized mixture of (1) 7 to 25% by weight of a monoester of a dihydric aliphatic alcohol having 2 to 8 carbon atoms with acrylic or methacrylic acid;
(2) 25 to 83% by weight of an ester of acrylic or methacrylic acid with a monohydric aliphatic alcohol having 1 to 8 carbon atoms;
(3) 10 to 50% by weight of vinylidene chloride; and
(4) 0 to 25% by weight of further copolymerizable monoolefinically unsaturated monomers, of which not more than 3.5% by weight contains groups capable of reacting with isocyanate groups.

References Cited

UNITED STATES PATENTS 3,247,017 4/1966 Eichler et al. ........ 117—235
3,357,855 12/1967 Bisschops et al. ...... 117—235
3,216,846 11/1965 Hendricx et al. .... 117—235 X
3,542,741 11/1970 Hartmann et al. .. 260—80.75 X WILLIAM D. MARTIN, Primary Examiner
B. D. PIANALTO, Assistant Examiner U.S. Cl. X.R.

117—161 KP, 161 UIT, 237; 260—80.75, 859 R